(12) United States Patent
Dangleman

(10) Patent No.: US 7,296,860 B2
(45) Date of Patent: Nov. 20, 2007

(54) RIM PROTECTOR

(76) Inventor: Adam Dangleman, 94-1056 Kaaholo St., Waipahu, HI (US) 96797

( * ) Notice: Subject to any disclaimer, the term of this patent is extended or adjusted under 35 U.S.C. 154(b) by 0 days.

(21) Appl. No.: 11/029,049

(22) Filed: Jan. 4, 2005

(65) Prior Publication Data
US 2006/0145528 A1    Jul. 6, 2006

(51) Int. Cl.
B60B 7/01    (2006.01)
(52) U.S. Cl. .............. 301/37.24; 301/37.22; 301/37.11
(58) Field of Classification Search ........... 301/37.101, 301/37.22, 37.24, 37.102, 37.11, 37.108, 301/37.42, 37.43
See application file for complete search history.

(56) References Cited

U.S. PATENT DOCUMENTS

| | | | | |
|---|---|---|---|---|
| 3,517,968 A | * | 6/1970 | Tully et al. ............... | 301/37.24 |
| 4,144,921 A | * | 3/1979 | Yabuta et al. ............. | 152/154.2 |
| 4,720,149 A | * | 1/1988 | Thissen et al. ............ | 301/5.21 |
| 4,811,991 A | | 3/1989 | Moreno et al. | |
| 4,874,206 A | | 10/1989 | Sampson et al. | |
| 4,955,670 A | | 9/1990 | Koller et al. | |
| 5,423,599 A | | 6/1995 | Sherod et al. | |
| 5,524,972 A | | 6/1996 | Cailor et al. | |
| 5,893,614 A | * | 4/1999 | Dennis .................... | 301/37.41 |
| 5,967,212 A | * | 10/1999 | Hameed ................... | 152/379.4 |
| 6,200,411 B1 | * | 3/2001 | Eikhoff et al. ............. | 156/329 |
| 6,270,167 B1 | * | 8/2001 | Kemmerer et al. ....... | 301/37.43 |
| 6,286,572 B1 | * | 9/2001 | Chen ........................ | 152/84 |
| 6,481,804 B2 | * | 11/2002 | Tanghetti ................. | 301/37.36 |
| 6,598,942 B1 | * | 7/2003 | Williams ................. | 301/37.11 |
| 6,641,225 B1 | * | 11/2003 | Amodeo, Jr. ........... | 301/37.103 |

* cited by examiner

*Primary Examiner*—Jason R. Bellinger
(74) *Attorney, Agent, or Firm*—Michael L. Greenberg, Esq.; Greenberg & Lieberman, LLC

(57) ABSTRACT

A rim protection apparatus fitted around a periphery of a rim of a motor vehicle wheel is provided. The rim protection apparatus covers the circumferential edge of the rim. The apparatus has a substantially planar circular protective ring and means for fitting the protective ring around the periphery of the rim. The protective ring has a front surface and a back surface, the back surface being coupled with the rim of the wheel when the apparatus is fitted around the periphery of the rim of the wheel, the front surface being a decorative surface accenting the color and appearance of the wheel. The protective ring is fitted around thin periphery of the rim with an adhesive layer disposed on the back surface of the protective ring.

7 Claims, 6 Drawing Sheets

RIM PROTECTOR

BACKGROUND OF THE INVENTION

1. Field of the Invention

The present invention relates to protective devices for motor vehicle wheels. More particularly, the present invention relates to an apparatus for protecting a rim of a motor vehicle wheel from damage, while also enhancing the color and design of the wheel.

2. Discussion of the Related Art

Motor vehicle wheels are frequently damaged on their side surfaces near the tires. The damage is more acute in case the wheels are made of some light alloy. The damage is usually caused by the wheel knocking and scraping against obstacles such as curbs, walls and stones.

In case of such damage, usually the rim of the wheel is bent or distorted, and a user is generally required to replace the entire wheel. To avoid having to change the entire wheel or the tire, the wheel may be fitted with a protective ring. The protective ring covers the rim of the wheel entirely, and protects it from being damaged when the wheel knocks or scrapes against obstacles.

Numerous types of rim protection devices are known in the art. For example, U.S. Pat. No. 5,423,599, issued Jun. 13, 1995 to Sherod et al. discloses a detachable wheel mask for temporarily covering an entire wheel of an automobile during washing and protecting the wheel from dirt while cleaning. The wheel mask includes a circular protective cover of a size corresponding with the wheel, a retaining element for fitting within a groove formed between the wheel rim and the tire to secure the protective cover to the wheel rim enclosing the wheel and a handle.

Whereas the foregoing wheel rim mask may provide adequate protection from tire dressing being applied to the wheel rim, such protective covers are not readily adjustable to fit a plurality of differently sized wheel rims. In addition, the wheel mask is a temporary fixture and is meant to provide protection against liquid spray when the wheel is being cleaned. The wheel mask does not provide protection against damage that occurs to the wheel rim, when the wheel knocks or scrapes against obstacles. The wheel mask is not tightly glued to the wheel, and hence, is liable to come off if a force is applied. Further, the wheel mask does not have a decorative function and therefore, does not accentuate the color and design of the wheel.

U.S. Pat. No. 5,524,972, issued Jun. 11, 1996 to Cailor et al. describes a wheel mask to protect the vehicle wheels during chemical treatment of the tires. The wheel mask is a thin plastic molding having a circular concave body that includes a central hub having an exterior handle. The handle is inwardly open and formed of walls which project outwardly of the hub and are tapered to permit partial insertion of a handle of another mask, and the ridge walls are angled outwardly to enhance stacking of a plurality of masks. This device suffers from the same disadvantages described above.

Wheel rim covers such as the one disclosed in U.S. Pat. No. 4,811,991, issued on Mar. 14, 1989 to Marino et al. is a hand-held device that can be held in place over the wheel rim with one hand while the user applies tire dressing to the tire with the other.

U.S. Pat. No. 4,874,206 issued on Oct. 17, 1989 to Sampson, and U.S. Pat. No. 4,955,670 issued on Sep. 11, 1990 to Koller discloses wheel rim covers that include attachment means so that such protective covers can be secured to the wheel rim to free up both hands of the user. This device suffers from the same disadvantages described above.

Japanese Pat. No. 07045016 issued on Aug. 27, 1996 to Tomita Auto describes a side rim protector, which prevents damage of a side rim of a road wheel of an automobile and increases decorative effect thereof. The side rim protector consists of a ringlike member having substantially equal diameter to that of a side rim and an engaging section which is one of mounting means formed integrally with the ringlike member. The side rim protector is fixed on a side rim side by fitting the engaging section in and engaging it with a groove on the side rim side. It is formed by resin or rubber and can be colored, thereby increasing decorative effect. The described side rim protector protects only a side rim of an automobile wheel. In addition since the side rim protector is constructed by using rubber, it is liable to be damaged sooner, if continuously used. Further since it is attached to the wheel using some engaging means and is not glued on to the wheel, it may come off when the wheel is used continuously for a prolonged period for time.

In light of the above, despite the attempts made by the prior art devices, there still exists a need for an improved motor vehicle rim protector which provides maximum protection to a rim of the wheel, when the wheel bumps or scrapes against obstacles, while also enhancing the appearance of the wheel. None of the prior art patents, taken alone or in combination, teaches or suggests the presently claimed rim protection apparatus for motor vehicle wheels.

SUMMARY OF THE INVENTION

The present invention provides a rim protection apparatus fitted around a periphery of a rim of a motor vehicle wheel. The apparatus comprises a substantially planar circular protective ring and means for fitting the protective ring around the periphery of the rim. The rim protection apparatus covers the circumferential edge of the rim wherein the protective ring is tightly coupled to the wheel. The protective ring comprises a first part covering a first surface of the rim in a first plane, the first plane being the plane of a sidewall of the motor vehicle wheel and a second part perpendicular to the first part covering a second surface of the rim, the second surface of the rim being perpendicular to the first surface of the rim. The protective ring further comprises a front surface and a back surface, the back surface being coupled with the rim of the wheel when the apparatus is fitted around the periphery of the rim of the wheel, the front surface being a decorative surface accenting the color and appearance of the wheel. The means for fitting the protective ring around the periphery of the rim comprises an adhesive disposed on the back surface of the protective ring. The rim protection apparatus is meant for actual vehicular use and protects the rim from potential scratches, bumps and deformation that result from day to day use of the wheel.

Accordingly a first objective of the invention is to provide an abrasion resistant rim protection apparatus for protecting a rim of a motor vehicle wheel from potential scratches, bumps and deformation that result from day to day use of the wheel.

A second objective of the invention is to provide a rim protection apparatus for protecting a rim of a motor vehicle wheel that accents the color and design of the wheel.

A third objective of the invention is to provide a rim protection apparatus for protecting a rim of a motor vehicle wheel that is constructed using a hard, light weight and abrasion resistant material such as plastic, metal, carbon fiber or fiber glass.

A fourth objective of the invention is to provide a rim protection apparatus for protecting a rim of a motor vehicle wheel that is custom designed to match the color and design of the wheel.

A fifth objective of the invention is to provide a rim protection apparatus for protecting a rim of a motor vehicle wheel, that is secured around a periphery of the rim using an adhesive layer.

A sixth objective of the invention is to provide a rim protection apparatus for protecting a rim of a motor vehicle wheel without spokes as well as a wheel with spokes.

A seventh objective of the invention is to provide a rim protection apparatus for protecting a rim of a motor vehicle wheel with spokes such that the protective ring covers the surface of the rim and comprises a plurality of extensions extending from at least one of the inner edge and the outer edge of the protective ring to a center of the wheel, each extension covering at least one spoke of the wheel.

An eighth objective of the invention is to provide a rim protection apparatus for protecting a rim of a motor vehicle wheel that is provided with a damage indicator disposed underneath the first part of the protective ring. The damage indicator indicates the need for replacement of the rim protection apparatus when the first part of the protective ring is scraped or damaged.

A ninth objective of the invention is to provide a rim protection apparatus for protecting a rim of a motor vehicle wheel that can be easily removed from the wheel by peeling off the protective ring from the wheel.

A tenth objective of the invention is to provide a rim protection apparatus for protecting a rim of a motor vehicle wheel that can be installed or replaced single handedly by a user without using any specialized installation tools.

These and other objects of the present invention will become readily apparent upon further review of the following description and drawings.

BRIEF DESCRIPTION OF THE DRAWINGS

A more complete appreciation of the invention, and many of the attendant advantages hereof, readily will be apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
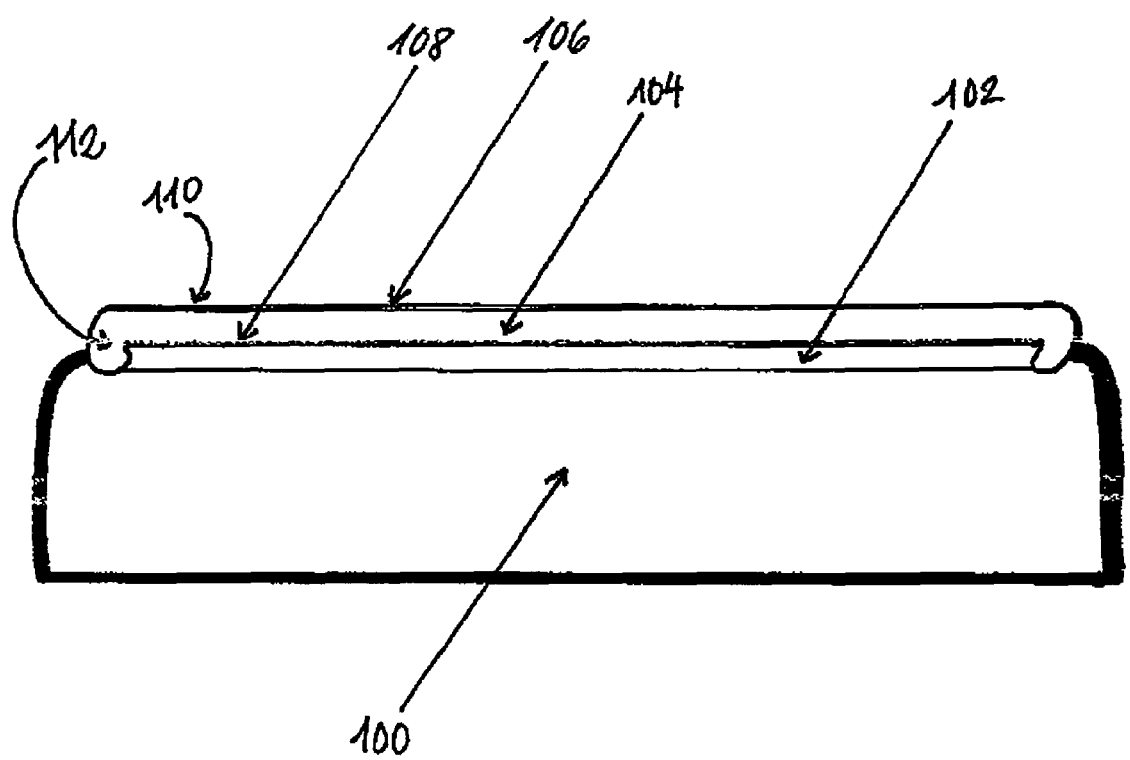
FIG. 1 illustrates a rim protection apparatus fitted around a periphery of a rim of a motor vehicle wheel, in accordance with an embodiment of the present invention.

FIG. 1 illustrates a rim protection apparatus fitted around a periphery of a rim (102) of a motor vehicle wheel (100) for protecting the rim (102), in accordance with an embodiment of the present invention. The rim protection apparatus comprises a protective ring (104) and means for fitting the protective ring (104) around the periphery of the rim (102). The rim protection apparatus is constructed using a hard, lightweight and abrasion resistant material that can absorb abuse and protect the rim (102) from being damaged. In various embodiments of the present invention, the rim protection apparatus is constructed using materials such as plastic, metal, carbon fiber or fiberglass. In various embodiments of the present invention, the rim protection apparatus is designed to protect various different styles of wheels such as wheels without spokes and wheels with spokes etc.

The protective ring (104) is substantially planar and circular and comprises a first part (106) and a second part (108) perpendicular to the first part (106). The first part (106) covers a first surface of the rim which is parallel to a sidewall of the of the motor vehicle wheel (100). The second part (108) covers a second surface of the rim, which is perpendicular to the first surface of the rim and the sidewall of the wheel (100). In addition, the protective ring (104) has an inner edge (110) and an outer edge (112) and a central aperture therein. (Inner edge (110) and outer edge (112) not shown). In an embodiment of the present invention, extra durability is provided to the first part (106) either, by constructing it using an abrasion resistant material or increasing its thickness. Extra durability is provided to the first part (106) since, the first part (106) is most liable to be damaged when the wheel (100) bumps, knocks or scrapes against obstacles. Therefore, since the first part (106) provides maximum protection to the rim (102), it is constructed in a manner that enables it to withstand repeated knocks and scrapes without necessitating repair.

The protective ring (104) further comprises an outer front surface (106) and an inner back surface (108). The back surface (108) is coupled with the rim (102), when the rim protection apparatus is fitted around the periphery of the rim (102). The front surface (106) is a decorative surface accenting color and appearance of the wheel (100). In an embodiment of the present invention, the front surface (106) is decorated using flashing lights, decorative lettering or holograms. In another embodiment, the front surface (106) is custom designed to match the color and design of the motor vehicle or the wheel (100). In yet another embodiment, the front surface (106) is suitably treated to provide a good ornamental effect. For example, the front surface (106) may be constructed using a metal sheet, which provides a smoother and shinier surface finish resulting directly from its production process, without requiring further polishing. The front surface (106) may be constructed using materials like aluminum, stainless steel or even plastic. In this case, too, a good ornamental effect can be conferred on the front surface (106) directly in the production process, or the front surface (106) can be subsequently painted, chromed or otherwise treated. Whether the front surface (106) is made of metal, carbon fiber, fiberglass or plastic, the material should preferably be shockproof and scratchproof to resist the shocks and scratching resulting from contact with curbs, walls, stones, etc.

The back surface (108) is provided with means for fitting the rim protection apparatus around the periphery of the rim (102) of the wheel (100). In an embodiment of the present invention, the means for fitting comprises an adhesive layer disposed on the back surface (108) of the protective ring (104). The back surface (108) is further provided with a removable backing tape for covering the adhesive layer, prior to the disposition of the protective ring (104) on the rim (102).

In an embodiment of the present invention, a damage-indicating material is disposed underneath the front surface (106) above the adhesive layer on the back surface (108). The damage-indicating material can be of a different color and design than the front surface (106). The damage-indicating material ensures that once the rim protection apparatus of the present invention is damaged to an extent that the front surface (106) is scraped; the impacts and abrasions on the damage-indicating material are visible to the user. Once the rim protection apparatus of the present invention has been damaged to the point of needing replacement, the visible change of color between the original front surface (106) and the exposed damage-indicating material, would serve as a visual reminder to the user for replacing the rim protection apparatus.

Therefore, the rim protection apparatus described in the present invention protects two different surface planes of the rim by covering the circumferential edge of the rim. In addition, the rim protection apparatus is easy to install, and can be done single handedly by a user without the use of any specialized installation tools. In an embodiment of the present invention, in order to install the rim protection apparatus, a user lines off the outer edge of the protective ring (104) on a side of the rim (102), where the rim touches the wheel (100), such that the protective ring (104) touches the wheel. Next, the user gradually places the protective ring (104), such that the protective ring (104) "cups" the circumferential edge of the rim (102). In an embodiment of the present invention, the rim protection apparatus is adhered around a circumferential edge of the rim (102) using the adhesive layer disposed on the back surface (108) of the protective ring, after removing the tape covering the adhesive layer. In an embodiment of the present invention, the rim protection apparatus can be removed from the wheel (100) by peeling it off the rim (102).

Figure 2:
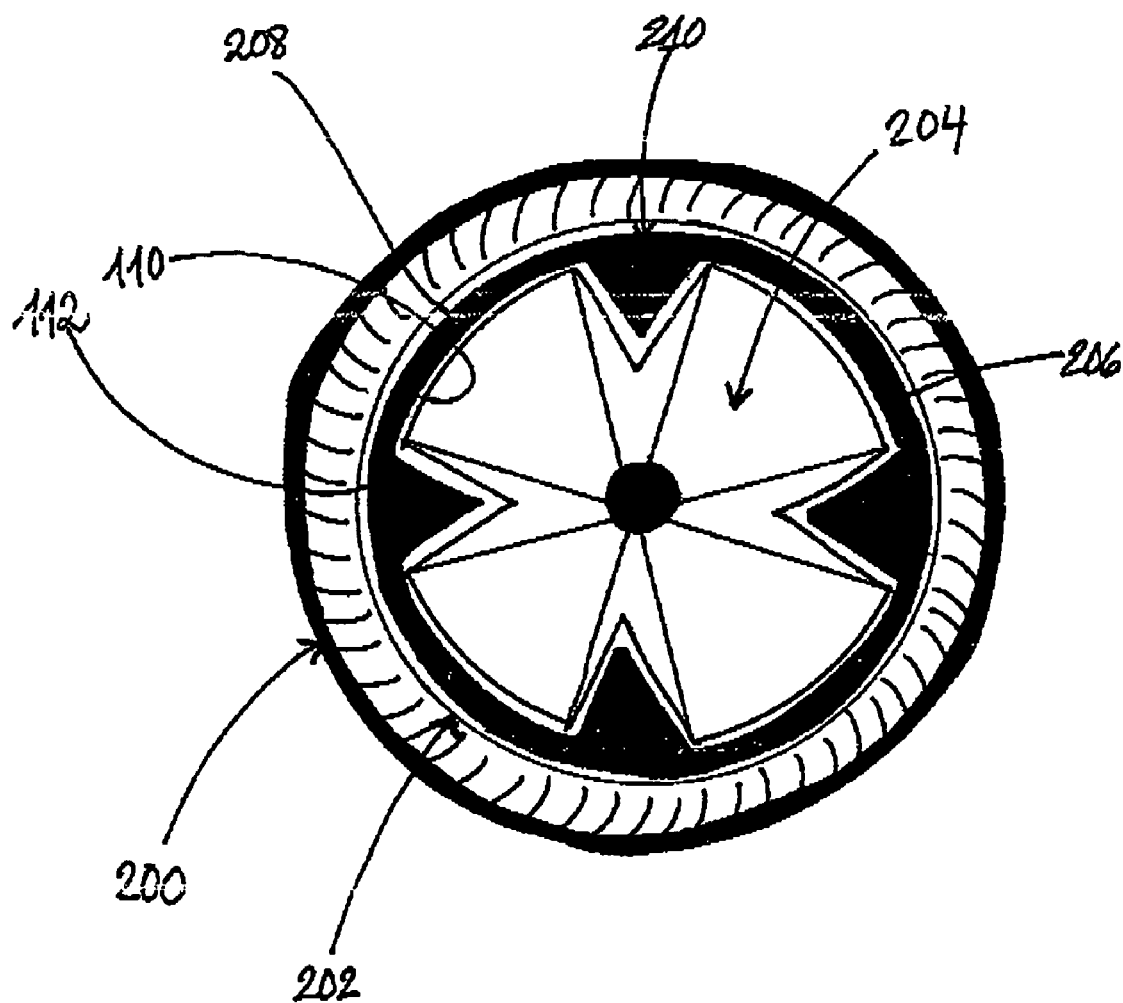
FIG. 2 illustrates a rim protection apparatus fitted around a periphery of a rim and spokes of a motor vehicle wheel having spokes, in accordance with an embodiment of the present invention.

FIG. 2 illustrates a rim protection apparatus fitted around a periphery of a rim (202) and spokes (204) of a motor vehicle (200) wheel having spokes (204), in accordance with an embodiment of the present invention. The protective ring (206) covers either a circumferential edge or the entire surface of the rim (202). The protective ring (206) comprises a plurality of extensions (210) extending from its inner edge or outer edge to the center of the wheel (200). The extensions (210) are preferably constructed using the same abrasion resistant materials as the protective ring (206). Each extension covers and provides protection to one spoke (204) of the wheel. In an embodiment of the present invention, the rim protection apparatus is fitted around the periphery of the rim (202) of the wheel (200) with spokes (204) by using a lip (208) of the wheel (200), (lip (208) is not shown). The lip (208) is disposed on the rim (202) and is coupled to the inner edge of the protective ring (206), when the rim protection apparatus is fitted around the periphery of the rim (204).

Figure 3:
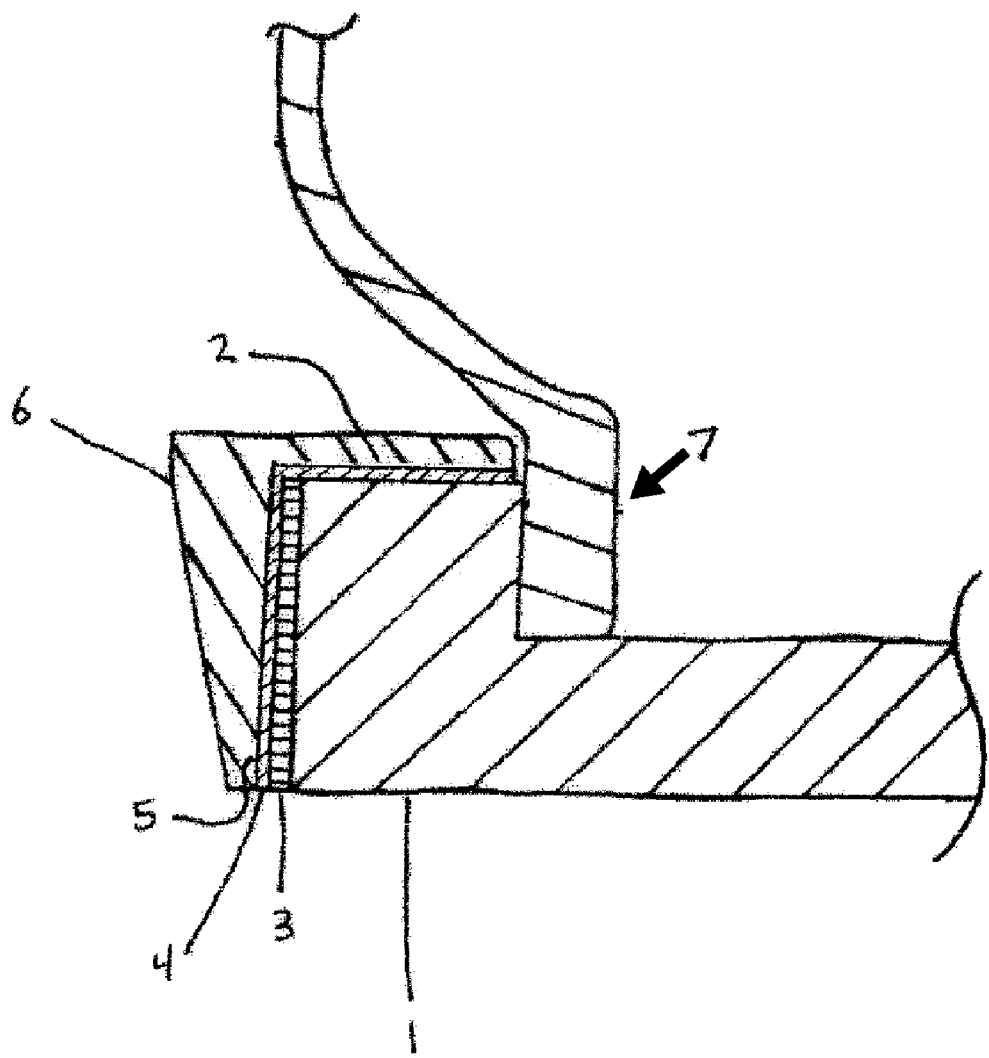
FIG. 3 illustrates a cross-sectional view of the rim protection apparatus as affixed to the rim of a motor vehicle, and shows the configuration of the adhesive layer, wear indicator layer, and second surface of the rim protection apparatus.

FIG. 3 illustrates a cross-sectional view of a rim protection apparatus fitted around a periphery of a rim (1) of an automobile. The rim protection apparatus has an adhesive layer (3) that affixes the rim protection apparatus directly to the periphery of the automobile's rim (1). In order to indicate scratches and nicks on the rim protectun apparatus, a wear indicator (4) is positioned between the adhesive (3) and the outer surface (5) of the first surface (6) of the rim protection apparatus. The first surface (6) and second surface (2) of the rim protection apparatus are perpendicular to each other, with the first surface (6) being parallel to the rim, and the second surface (2) being perpendicular to the rim. The rim protection apparatus does not cause any separation between the tire and the rim of an automobile, thus permitting the tire and rim (7) to directly touch each other.

Figure 4:
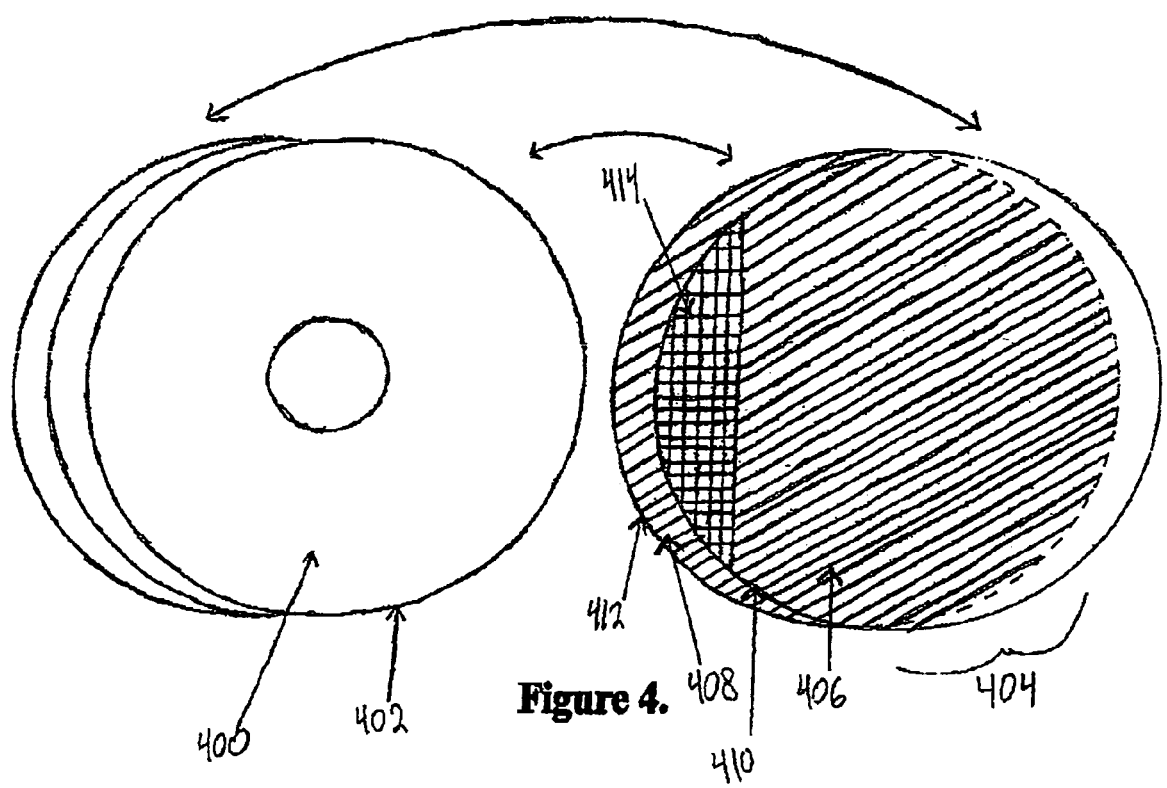
FIG. 4 illustrates a perspective view of the rim of a motor vehicle and the rim protection apparatus, and shows the adhesive material of the rim protection apparatus partially covered with tape.

FIG. 4 illustrates a perspective view of a rim protection apparatus (404) apart from a rim of an automobile (400). The rim protection apparatus (404) has a first surface (406) and a second surface (408), which are perpendicular to each other. As shown in FIG. 4, the second surface (408) is generally extending upward, and the first surface (406) is generally circular. The second surface (408) extends around the perimeter of the first surface (406) along the inner edge (110) of the rim protection apparatus (404). The second surface (408) has a length that extends from its inner edge (410) to its outer edge (412). On the first surface (406) of the rim protection apparatus (404) is an adhesive, which is marked on FIG. 4 by diagonal lines. Before it is first used, the adhesive will be covered by tape (414), which is shown as partially removed in FIG. 4. To apply the rim protection apparatus (404) to the rim of an automobile (400), the rim protection apparatus (404) as shown in FIG. 4 would be flipped and fitted around the periphery of the rim (402). Doing so would apply the adhesive of the rim protection apparatus (404) to the surface of the rim, and would allow the second surface (408) to fit around the sides of the rim's periphery (402).

Figure 5:
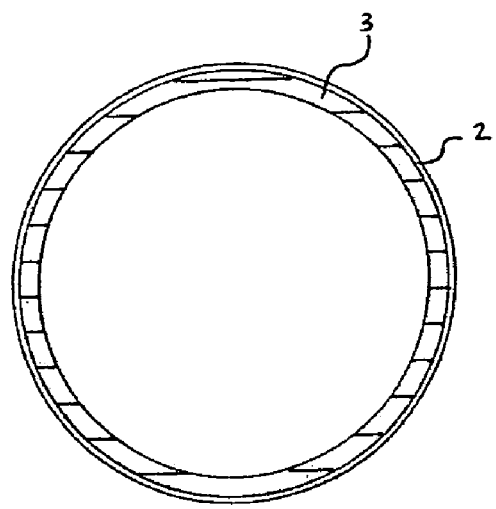
FIG. 5 illustrates a side view of the rim protection apparatus, and shows the second surface surrounding the adhesive layer.

FIG. 5 illustrates a side view of a rim protection apparatus apart from a rim of a vehicle. The second surface (2) is shown around the outer perimeter of the rim protection apparatus. Upon application to a rim of a vehicle, the second surface (2) would fit around the vehicle's rim and affix thereon by means of the adhesive layer (3). The adhesive layer (3) is shown in FIG. 5 to form an inner perimeter belt, however, in the various embodiments of the present invention, the adhesive layer (3) may cover the entire inner surface of the rim protection apparatus.

Figure 6:
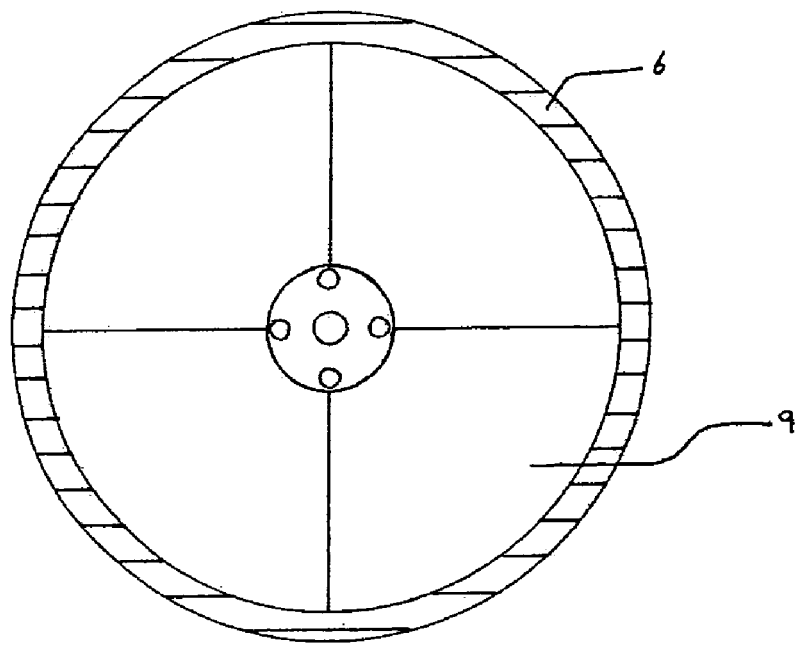
FIG. 6 illustrates a side view of the rim protection apparatus as mounted on the wheel of a vehicle.

FIG. 6 illustrates a side view of a rim protection apparatus as mounted on a rim of a vehicle. The first surface (6) of the rim protection apparatus is shown to be fitted around the periphery of the rim (9) of the vehicle.

Therefore, the rim protection apparatus described in the present invention, protects the rim of a motor vehicle wheel against damage caused due to the knocking or scraping of the wheel against obstacles. In various embodiments of the present invention, the rim protection apparatus is flush mounted around the periphery of rims of wheels of various styles and designs. Further, the rim protection apparatus of the present invention is a permanent fixture on the wheel and accents the color and design of the wheel. In case of extensive damage caused to the rim protection apparatus, the same can easily be removed or replaced, single handedly, by a user without requiring any specialized removal or installation tools.

While the present invention has been described in terms of certain preferred embodiments, one skilled in the art will readily appreciate that various modifications, changes, omissions and substitutions may be made without departing from the spirit thereof. It is intended, therefore, that the present invention be not limited solely by the scope of the following claims.

I claim:

1. A rim protection apparatus adhered to the periphery of a rim of a motor vehicle wheel, the apparatus comprising:
   a circular, impact-absorbing, protective ring comprising:
   a first part covering a first surface of the rim in a first plane, the first plane being the plane of a sidewall of the motor vehicle wheel;
   a second part perpendicular to the first part covering a second surface of the rim, the second surface of the rim being perpendicular to the first surface of the rim;
   a means for adhering said impact absorbing protective ring around the periphery of the rim in a flush mounting, such that the apparatus covers the circumferential edge of the rim, wherein said impact absorbing protective ring is securely coupled to the wheel;
   an adhesive layer disposed on at least one area of said first part and said second part of said impact absorbing protective ring;
   wherein said impact absorbing protective ring is configured such that it may be adhered and removed by hand solely by means of said adhesive layer; and,
   wherein said impact-absorbing protective ring comprises a front surface and an inner surface, the inner surface being coupled with the rim of the wheel when the apparatus is fitted around the periphery of the rim of the wheel, the-outer surface being a decorative surface accenting the color and appearance of the wheel, said impact absorbing protective ring having an inner edge and an outer edge.

2. A rim protection apparatus adhered to the periphery of a rim of a motor vehicle wheel, the apparatus comprising:
   a circular, impact-absorbing, protective ring comprising:
   a first part covering a first surface of the rim in a first plane, the first plane being the plane of a sidewall of the motor vehicle wheel;
   a second part perpendicular to the first part covering a second surface of the rim, the second surface of the rim being perpendicular to the first surface of the rim;
   a means for adhering said impact absorbing protective ring around the periphery of the rim in a flush mounting, such that the apparatus covers the circumferential edge of the rim, wherein said impact absorbing protective ring is securely coupled to the wheel;
   an adhesive layer disposed on at least one area of said first part and said second part of said impact absorbing protective ring;
   wherein said impact absorbing protective ring is configured such that it may be adhered and removed by hand solely by means of said adhesive layer;
   wherein said impact absorbing protective ring is configured to protect the rim and spokes when the apparatus is adhered around a periphery of a rim of a wheel with spokes, the impact absorbing protective ring covering the surface of the rim, the impact absorbing protective ring comprising a plurality of extensions extending from at least one of the inner edge and the outer edge of the impact absorbing protective ring to a center of the wheel, each extension covering at least one spoke of the wheel.

3. A rim protection apparatus adhered to the periphery of a rim of a motor vehicle wheel, the apparatus comprising:
   a circular, impact-absorbing, protective ring comprising:
   a first part covering a first surface of the rim in a first plane, the first plane being the plane of a sidewall of the motor vehicle wheel;
   a second part perpendicular to the first part covering a second surface of the rim, the second surface of the rim being perpendicular to the first surface of the rim;
   a means for adhering said impact absorbing protective ring around the periphery of the rim in a flush mounting, such that the apparatus covers the circumferential edge of the rim, wherein said impact absorbing protective ring is securely coupled to the wheel;
   an adhesive layer disposed on at least one area of said first part and said second part of said impact absorbing protective ring;
   wherein said impact absorbing protective ring is configured such that it may be adhered and removed by hand solely by means of said adhesive layer; and
   wherein said impact-absorbing protective ring is removed from the wheel by peeling off said impact-absorbing protective ring, said impact-absorbing protective ring being removed in case of damage, the damage being indicated by a damage indicator disposed underneath the first part of said impact-absorbing protective ring, the damage indicator being disposed above said adhesive layer.

4. A rim protection apparatus adhered to the periphery of a rim of a motor vehicle wheel, the apparatus comprising:
   a circular, impact-absorbing, protective ring comprising:
   a first part covering a first surface of the rim in a first plane, the first plane being the plane of a sidewall of the motor vehicle wheel;
   a second part perpendicular to the first part covering a second surface of the rim, the second surface of the rim being perpendicular to the first surface of the rim;
   a means for adhering said impact absorbing protective ring around the periphery of the rim in a flush mounting, such that the apparatus covers the circumferential edge of the rim, wherein said impact absorbing protective ring is securely coupled to the wheel;
   an adhesive layer disposed on at least one area of said first part and said second part of said impact absorbing protective ring;
   wherein said impact absorbing protective ring is configured such that it may be adhered and removed by hand solely by means of said adhesive layer; and
   wherein the front surface of said impact-absorbing protective ring is custom designed to match the color and design of the wheel, said impact-absorbing protective ring accentuating the color and design of the wheel while protecting the rim of the wheel.

5. A rim protection apparatus fitted around a periphery of a rim of a motor vehicle wheel, the apparatus comprising:
   a substantially planar circular protective ring comprising:
   a first part covering a first surface of the rim in a first plane, the first plane being the plane of a sidewall of the of the motor vehicle wheel;
   a second part perpendicular to the first part covering a second surface of the rim, the second surface of the rim being perpendicular to the first surface of the rim;
   a means for fitting the protective ring around the periphery of the rim, the apparatus covering the circumferential edge of the rim, wherein the protective ring is securely coupled to the wheel; and
   wherein the apparatus is removed from the wheel by peeling off the protective ring, the ring being removed in case of damage, the damage being indicated by a damage indicator disposed underneath the first part of the protective ring, the damage indicator being disposed above an adhesive layer.

6. A rim protection apparatus adhered to the periphery of a rim of a motor vehicle wheel, the apparatus comprising:
- a circular, impact-absorbing, protective ring comprising:
  - a first part covering a first surface of the rim in a first plane, the first plane being the plane of a sidewall of the motor vehicle wheel;
  - a second part perpendicular to the first part covering a second surface of the rim, the second surface of the rim being perpendicular to the first surface of the rim;
  - a means for adhering said impact absorbing protective ring around the periphery of the rim in a flush mounting, such that the apparatus covers the circumferential edge of the rim, wherein said impact absorbing protective ring is securely coupled to the wheel;
  - an adhesive layer disposed on at least one area of said first part and said second part of said impact absorbing protective ring;
  - wherein said impact absorbing protective ring is configured such that it may be adhered and removed by hand solely by means of said adhesive layer; and
  - wherein said adhesive layer can be single handedly adhered by a user without the use of any specialized installation tools and installation is easily reversible by the user.

7. A rim protection apparatus adhered to the periphery of a rim of a motor vehicle wheel, the apparatus comprising:
- a circular, impact-absorbing, protective ring comprising:
  - a first part covering a first surface of the rim in a first plane, the first plane being the plane of a sidewall of the motor vehicle wheel;
  - a second part perpendicular to the first part covering a second surface of the rim, the second surface of the rim being perpendicular to the first surface of the rim;
  - a means for adhering said impact absorbing protective ring around the periphery of the rim in a flush mounting, such that the apparatus covers the circumferential edge of the rim, wherein said impact absorbing protective ring is securely coupled to the wheel;
  - an adhesive layer disposed on at least one area of said first part and said second part of said impact absorbing protective ring;
  - wherein said impact absorbing protective ring is configured such that it may be adhered and removed by hand solely by means of said adhesive layer; and
  - wherein said adhesive layer is revealed by removing a protective covering from said rim protection apparatus.

* * * * *